United States Patent [19]

Olschewski et al.

[11] 4,328,999

[45] May 11, 1982

[54] LINEAR MOTION ROLLING BEARING

[75] Inventors: Armin Olschewski, Schweinfurt; Manfred Brandenstein, Eussenheim; Lothar Walter, Schweinfurt; Horst M. Ernst, Eltingshausen, all of Fed. Rep. of Germany

[73] Assignee: SKF Kugellagerfabriken GmbH, Schweinfurt, Fed. Rep. of Germany

[21] Appl. No.: 127,653

[22] Filed: Mar. 6, 1980

[30] Foreign Application Priority Data

Mar. 10, 1979 [DE] Fed. Rep. of Germany ....... 2909508

[51] Int. Cl.³ .............................................. F16C 29/06
[52] U.S. Cl. ..................................... 308/6 C; 308/201; 464/168
[58] Field of Search ................ 64/23.7; 308/6 A, 6 B, 308/6 C, 6 R, 188, 189 R, 193, 195, 201

[56] References Cited

U.S. PATENT DOCUMENTS

| 4,123,121 | 10/1978 | Ernst et al. | 308/6 C |
| 4,128,279 | 12/1978 | Ernst et al. | 308/6 C |
| 4,181,374 | 1/1980 | Ernst et al. | 308/6 C |

Primary Examiner—Frederick R. Schmidt
Attorney, Agent, or Firm—Daniel M. Rosen

[57] ABSTRACT

A linear motion rolling bearing including an outer sleeve and a cage with loaded and return races defined therebetween and a plurality of roller elements in these races, has opposite end rings molded onto the outer sleeve and formed as a unitary structure with the outer sleeve including strips extending between and connected to the rings and extending axially along the bore of the outer sleeve, to maintain the end rings aligned and non-rotatable relative to the outer sleeve.

4 Claims, 3 Drawing Figures

LINEAR MOTION ROLLING BEARING

BACKGROUND OF THE INVENTION

The present invention is in the field of linear motion rolling bearings. A typical bearing includes an outer sleeve provided in its bore with axial recesses for the rolling elements under load and return passages for the elements not under load, a cage installed in the bore with a plurality of circumferentially distributed channels consisting of axial races for the loaded and nonloaded rolling elements, semicircular turnarounds connecting the races to each other in pairs, endless rows of rolling elements arranged in the channels, and end rings fixed to the ends of the outer sleeve to close off the cage at the ends.

DESCRIPTION OF THE PRIOR ART

In one known linear motion rolling bearing of this kind, an end ring is placed on each end of the cage and fixedly welded or forced into place as disclosed in U.S. Pat. No. 4,123,121. In many cases the end ring must then be provided with axial projections to engage matching axial grooves or flutes in the outer sleeve, so as to hold the end rings on the outer sleeve sufficiently secure against rotation. In these known bearings care must be taken to see that the end rings, when placed and fixed on the cage, are not off-center or out of alignment with the outer sleeve. The result of such misalignment would be that in assembling the bearing and inserting the assembled bearing axially in the bore of a housing, binding forces would be set up that might damage the bearing. In an extreme case these forces might loosen the end rings from their seating on the cage when the bearing is installed. Faulty centering might moreover impair the sealing action of a sealing ring installed in the end ring, if its sealing lip were to fail to make uniform contact with the periphery of the shaft. Lastly, the fabrication of such known bearings is costly because in many cases axial projections provided on the end rings for security against rotation must be fitted into matching axial grooves or flutes in the outer sleeve with comparatively close finished tolerances, and because fastening of the end rings placed on the ends of the cage requires a separate operation such as welding or peening.

SUMMARY OF THE INVENTION

The object of the invention is to improve linear motion rolling bearings of the type specified above in such a manner as to preclude faulty centering or misalignment of the end rings relative to the outer sleeve. It is intended furthermore for the new bearings to be of rugged construction and economical in fabrication.

As a result of the arrangement according to the invention, the outer sleeve together with the two end rings may be accurately formed by injection molding or casting as a solid rugged component of the bearing. By molding the end-rings onto the outer sleeve and simultaneously about the sleeve along the length of the bore thereof, the result will be a unitary product with both end-rings made in the same mold. The outer sleeve will be perfectly flush with the two rings arranged at the ends, and accordingly the bearing can be axially inserted in the bore of a housing without injurious binding or other damage. Finally, by this simple means, the end rings are fixed and secured against rotation on the outer sleeve.

A number of advantageous refinements or embodiments of the invention are described later in detail. In one embodiment the end rings, by a process of injection molding, may be united into one structural part, this process being especially economical when large quantities are produced. A synthetic material having vibration-damping and/or wear-resisting properties may advantageously be used on the end ring surfaces covering the semicircular turnarounds to reduce noise of the rolling elements on these surfaces.

In another embodiment vibration damping of the rolling elements is further achieved by applying a coat of the comparatively soft injectable or castable material onto the return races in the outer sleeve.

In a further embodiment a cost of the wear-resistant injectable or castable material on the outer sleeve where it seats in the bore of a housing, provides vibration damping support for the bearing. When this material is elastically yieldable the support is adjustable. This coating on the outer sleeve will also prevent injurious rust formation on the seating surface between the outer ring and the bore of the housing. Lastly, the coating of the outer sleeve imparts a uniformly pleasing appearance to the bearing.

The linear motion rolling bearing of this invention will be further illustrated by the following description of two preferred embodiments which are illustrated in the appended drawings.

DESCRIPTION OF THE DRAWINGS AND PREFERRED EMBODIMENTS

Figure 1:
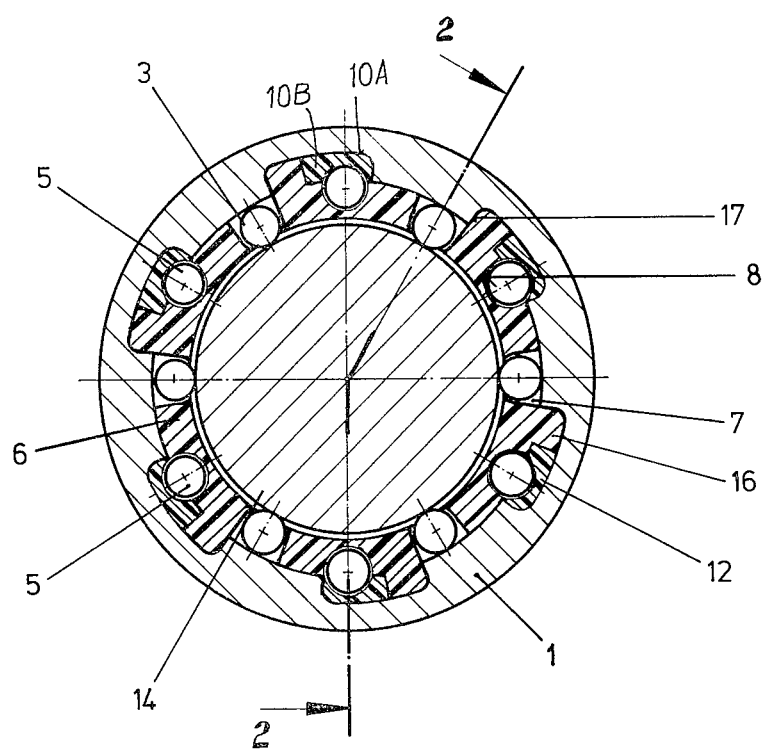
FIG. 1 shows a cross-section of a linear motion rolling bearing representing a section taken along line 1—1 in FIG. 2.
Figure 2:
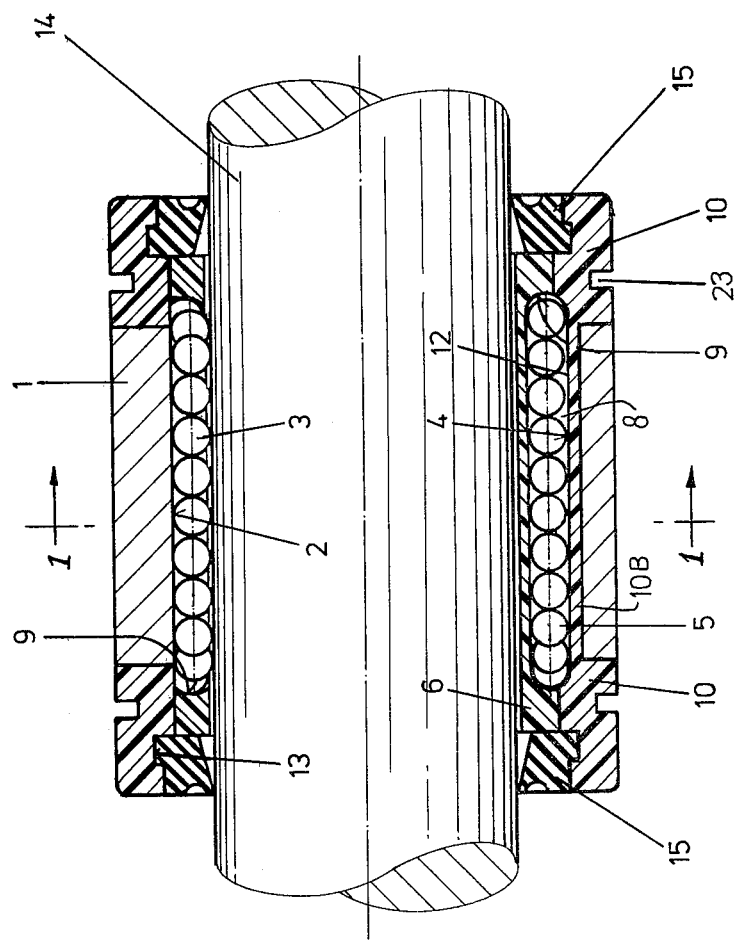
FIG. 2 shows a lengthwise section taken along line 2—2 of the bearing shown in FIG. 1.

In FIGS. 1 and 2 the outer sleeve 1 of a linear motion rolling bearing is made of a hard metal such as bearing steel. In the bore of this outer sleeve 1, axial races 2 for the balls 3 under load and return passages 4 for the balls 5 not under load are arranged. A cage 6 is installed in the bore of the outer sleeve 1, having a plurality of circumferentially distibuted channels and endless rows of balls arranged in the channels. Each channel of cage 6 consists of an axial race 7 for balls 3 under load, an axial race 8 for balls 5 not under load, and semicircular turnarounds 9 connecting the straight races 7, 8 to each other in pairs.

At each end of the outer sleeve 1 an end ring 10 is arranged, covering the semicircular turnarounds 9 of cage 6, so that the balls 5 not under load cannot drop radially out of the turnarounds 9. These end rings 10, consisting of an injectable or castable material, such as synthetic material, are fixedly connected to the outer sleeve 1 by molding or casting onto the outer sleeve and along grooves 10A, forming axial strips 10B between and connecting the two end rings 10 which thus form with the outer sleeve 1 a unitary structure. On the return races 4 of the outer sleeve 1 a layer 12 of the injectable or castable material is applied, preventing direct contact of the loose balls 5 with the hard outer sleeve 1 and thus acting to damp vibrations. This layer 12 also prevents the balls 5 from causing wear on the return races 4 in service. This injectable or castable material may optionally be loaded with a lubricant, for example graphite, molybdenum disulfide or the like.

Since the end rings 10 are molded onto and along the length of outer sleeve 1, these end rings 10 are always held centered on the outer sleeve 1, even as they are situated over the turnaround 9.

In the bore of each end ring 10 an annular groove 13 is formed, into which a sealing ring 15 sliding on shaft 14 is elastically snapped. The two sealing rings 15 respectively opposing the respective faces of the cage 6 will axially fix the cage 6 in the bore of the outer sleeve 1.

When assembling the longitudinal rolling bearing, first the balls 3, 5 are loaded in the channels of cage 6. Then the cage 6, complete with balls 3, 5, is inserted in the unitary fixed structural unit formed by the outer sleeve 1 with end rings 10 molded or cast thereon. As clearly seen in FIG. 1, radial, lengthwise projections 16 of cage 6 will then enter between the grooves 10A and the shoulders 17 of the outer sleeve 1, holding the cage 6 secure against rotation in the bore of the outer sleeve 1. Finally, the two sealing rings 15 are snapped into their annular grooves 13, holding the cage 6 axially inside the bore of the outer sleeve 1.

On the periphery of each end ring an annular groove 23 is provided, in which an ordinary expansion ring (not shown) may be placed to secure the bearing in the bore of a housing.

Figure 3:
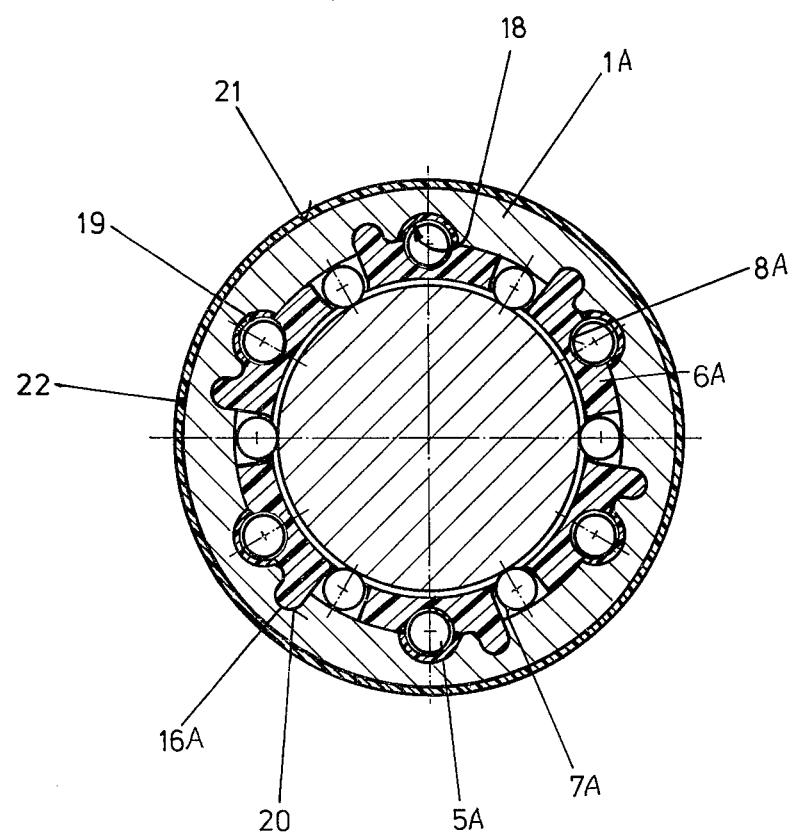
FIG. 3 shows a cross-section similar to FIG. 1 of another embodiment of a linear motion rolling bearing.

FIG. 3 shows a modified linear motion rolling bearing similar in construction to that of FIGS. 1 and 2, with race 7A for balls under load and return race 8A for balls not under load. In this modified bearing, however, each return passage 18 is provided with a comparatively thin layer 19 of injectable or castable synthetic material. The layer 19 applied to each return race 18 in this case, is a longitudinal groove with cross-section suited to the contour of the rolling elements 5A, so that the return races 18 of the outer sleeve 1A will open into the bores of the two end rings (not shown) with no edges or radial offsets. The outer sleeve 1A forms a unitary solid precision part together with the end rings as annular elements thereon.

The cage 6A has radial projections 16A entering lengthwise grooves 20 in the outer sleeve 1A so that the cage is geometrically locked against rotation in the outer sleeve. The periphery 21 of the outer sleeve 1A at the time of molding the end rings onto and about the outer sleeve, is provided with a coating 22 of the injectable or castable synthetic material, in this case possessing elastic properties. The coating 22 prevents direct contact between the metal outer sleeve 1A and the seat of the bearing in the housing (not shown). Thus, the danger of injurious rusting such as would occur with metal-to-metal contact between the outer sleeve and the housing is averted. The bearing provided with this coat 22 can be pressed without damaging its peripheral surface into the bore of a housing (not shown), since there are no sharp edges or transitions between outer sleeve 1A and end ring on the peripheral surface. Since the layer 22 is elastically yielding, any shaft deflections or misalignments will be automatically compensated. Finally, the layer 22 lends a pleasing uniform appearance to the bearing.

The longitudinal rolling bearing according to the invention has the great advantage of precluding faulty centering or misalignment of the end rings relative to the outer sleeve and of permitting rugged and economical fabrication.

This linear motion rolling bearing may be further modified in the spirit of the invention. In particular, the cage installed in the bore of the outer sleeve need not be retained by snap-in sealing rings. Instead, the cage may be axially fixed by means of conventional expansion rings in annular grooves on the end rings, or else by means of nuts to be screwed into the end bore. The rolling elements need not be spherical; with appropriate modification of the guide tracks and races; they may be in the shape of rollers.

What is claimed is:

1. In a linear motion rolling bearing including (a) an outer sleeve provided in its bore with axial races for the rolling elements under load and return passages for the elements not under load, (b) a cage situated in said bore and defining with said sleeve a plurality of circumferentially distributed channels consisting of axial races for the rolling elements under load and not under load and semicircular turnarounds connecting said races to each other in pairs, (c) endless rows of rolling elements arranged in said channels, and (d) an end ring fixed to each end of the outer sleeve to close off the cage at said ends, the improvement wherein said end rings comprise axially spaced annular elements from material molded or cast onto said outer sleeve together with at least one axial element extending along said outer sleeve and between and connecting said annular elements, said end rings and outer sleeve being a unitary structure.

2. A bearing according to claim 1, wherein said end rings are molded or cast of a synthetic material onto said outer sleeve.

3. A bearing according to claim 1 or 2, further comprising a coating of said material on said return passages in said outer sleeve.

4. A bearing according to claim 2, further comprising a coating of said material on the periphery of said outer sleeve.

* * * * *